United States Patent
Xiao et al.

(10) Patent No.: US 11,176,959 B2
(45) Date of Patent: Nov. 16, 2021

(54) SENTIMENTAL AND EMOTIONAL ANALYSIS OF ELECTRONIC DOCUMENTS

(71) Applicant: International Business Machines Corporation, Armonk, NY (US)

(72) Inventors: Di Xiao, Toronto (CA); Adam J. Storm, Toronto (CA)

(73) Assignee: International Business Machines Corporation, Armonk, NY (US)

(*) Notice: Subject to any disclaimer, the term of this patent is extended or adjusted under 35 U.S.C. 154(b) by 290 days.

(21) Appl. No.: 16/549,235

(22) Filed: Aug. 23, 2019

(65) Prior Publication Data

US 2021/0056982 A1    Feb. 25, 2021

(51) Int. Cl.
| | | |
|---|---|---|
| *G10L 25/63* | (2013.01) | |
| *G10L 25/78* | (2013.01) | |
| *G06F 15/02* | (2006.01) | |
| *G06Q 30/06* | (2012.01) | |
| *G09B 5/06* | (2006.01) | |

(Continued)

(52) U.S. Cl.
CPC .......... *G10L 25/63* (2013.01); *G06F 15/0283* (2013.01); *G06F 15/0291* (2013.01); *G06F 40/20* (2020.01); *G06F 40/30* (2020.01); *G06Q 30/0631* (2013.01); *G09B 5/062* (2013.01); *G10L 25/78* (2013.01); *G10L 2025/783* (2013.01)

(58) Field of Classification Search
CPC ....... G06F 15/0291; G06F 40/20; G06F 40/30
See application file for complete search history.

(56) References Cited

U.S. PATENT DOCUMENTS

2002/0178057 A1* 11/2002 Bertram ............ G06F 16/90324
                                                                 705/14.23
2009/0157714 A1*  6/2009 Stanton ................ G06K 9/6215
(Continued)

FOREIGN PATENT DOCUMENTS

KR    1020180090764 A    8/2018

OTHER PUBLICATIONS

Anonymous, "A Method and System for Associating Emotions with Media for Improved Correlations and Recommendations," https://priorart.ip.com/IPCOM/000238505, IP.com No. IPCOM000238505D, Aug. 31, 2014, 4 pgs.

(Continued)

*Primary Examiner* — Samuel G Neway
(74) *Attorney, Agent, or Firm* — Peter K. Suchecki

(57) ABSTRACT

Provided is a method and system for recommending an e-book. A processor may collect reader data related to a plurality of e-books from a plurality of user devices. The processor may determine an interest score for each section of a plurality of sections of each e-book. The processor may identify a set of sections from the plurality of sections that meet a predetermined interest score threshold. The processor may analyze the set of sections to determine a sentimental score for each section. The processor may generate a scoring matrix using the interest score and the sentimental score for each section of each e-book. The processor may compare scoring matrices of each e-book of the plurality of e-books. The processor may identify two or more e-books having similar scoring matrices. The processor may provide a recommendation to a user based on the identified two or more e-books.

20 Claims, 7 Drawing Sheets

(51) Int. Cl.
    *G06F 40/30*     (2020.01)
    *G06F 40/20*     (2020.01)

(56) References Cited

U.S. PATENT DOCUMENTS

| | | | |
|---|---|---|---|
| 2014/0281960 A1* | 9/2014 | Bank | G06Q 50/01 715/705 |
| 2014/0298364 A1* | 10/2014 | Stepanov | H04N 21/4758 725/10 |
| 2015/0154246 A1* | 6/2015 | Allen | G06F 16/38 707/758 |
| 2017/0169498 A1* | 6/2017 | Kawamura | G06Q 30/0625 |
| 2018/0107645 A1* | 4/2018 | Payne | G06F 16/9536 |
| 2021/0056982 A1* | 2/2021 | Xiao | G06Q 30/0631 |

OTHER PUBLICATIONS

Jockers, M. "A Novel Method for Detecting Plot," http://www.matthewjockers.net/2014/06/05/a-novel-method-for-detecting-plot/, Jun. 5, 2014, printed Jun. 11, 2019, 2 pgs.

Martin Kaste Twitter, "Is Your E-Book Reading Up on You?" https://www.npr.org/2010/12/15/132058735/is-your-e-book-reading-up-on-you, printed Jun. 11, 2019, 2 pgs.

Mell et al., "The NIST Definition of Cloud Computing," Recommendations of the National Institute of Standards and Technology, U.S. Department of Commerce, Special Publication 800-145, Sep. 2011, 7 pgs.

Priyanka et al., "Personalised Book Recommendation System based on Opinion Mining Technique," https://ieeexplore.ieee.org/document/7342668/, Proceedings of 2015 Global Conference on Communication Technologies (GCCT 2015), pp. 285-289.

* cited by examiner

SENTIMENTAL AND EMOTIONAL ANALYSIS OF ELECTRONIC DOCUMENTS

BACKGROUND

The present disclosure relates generally to the field of analyzing electronic documents, and more specifically, to analyzing electronic books (e-books) using sentimental and emotional analysis to generate book recommendations for one or more users.

Book recommendations and/or book reviews are typically based on word of mouth and/or textual reviews from readers that have read the respective book. In most instances, the book recommendation/review is based on a subjective analysis by the book reviewer on how the reviewer felt while reading the book.

SUMMARY

Embodiments of the present disclosure include a method, computer program product, and system for providing book recommendations based on sentimental and emotional analysis. A processor may collect reader data related to a plurality of electronic books (e-book) from a plurality of user devices. The reader data is representative of reading habits of a plurality of users. The processor may determine an interest score for each section of a plurality of sections of each e-book using the reader data. The interest score is indicative of interest of the plurality of users when reading each section. The processor may identify a set of sections from the plurality of sections of each e-book that meet a predetermined interest score threshold. The processor may analyze the set of sections to determine a sentimental score for each section. The processor may generate a scoring matrix using the interest score and the sentimental score for each section of the set of sections of each e-book. The processor may compare scoring matrices of each e-book of the plurality of e-books. The processor may identify two or more e-books having similar scoring matrices. The processor may provide a recommendation to one or more users based on the identified two or more e-books.

Embodiments of the present disclosure include a method, computer program product, and system for recommending a book based on sentimental and emotional analysis. A processor may receive, from a user, a request for a recommendation for a book that is similar to a first electronic book (e-book). The processor may determine an interest score for the first e-book and for a plurality of other e-books. The processor may analyze the first e-book and the plurality of other e-books to determine a set of sentimental scores for the e-books. The processor may compare a scoring matrix for the first e-book to the scoring matrices for the plurality of e-books. The processor may determine, based on the comparing, that a second e-book of the plurality of e-books is similar to the first e-book. The processor may recommend the second e-book to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
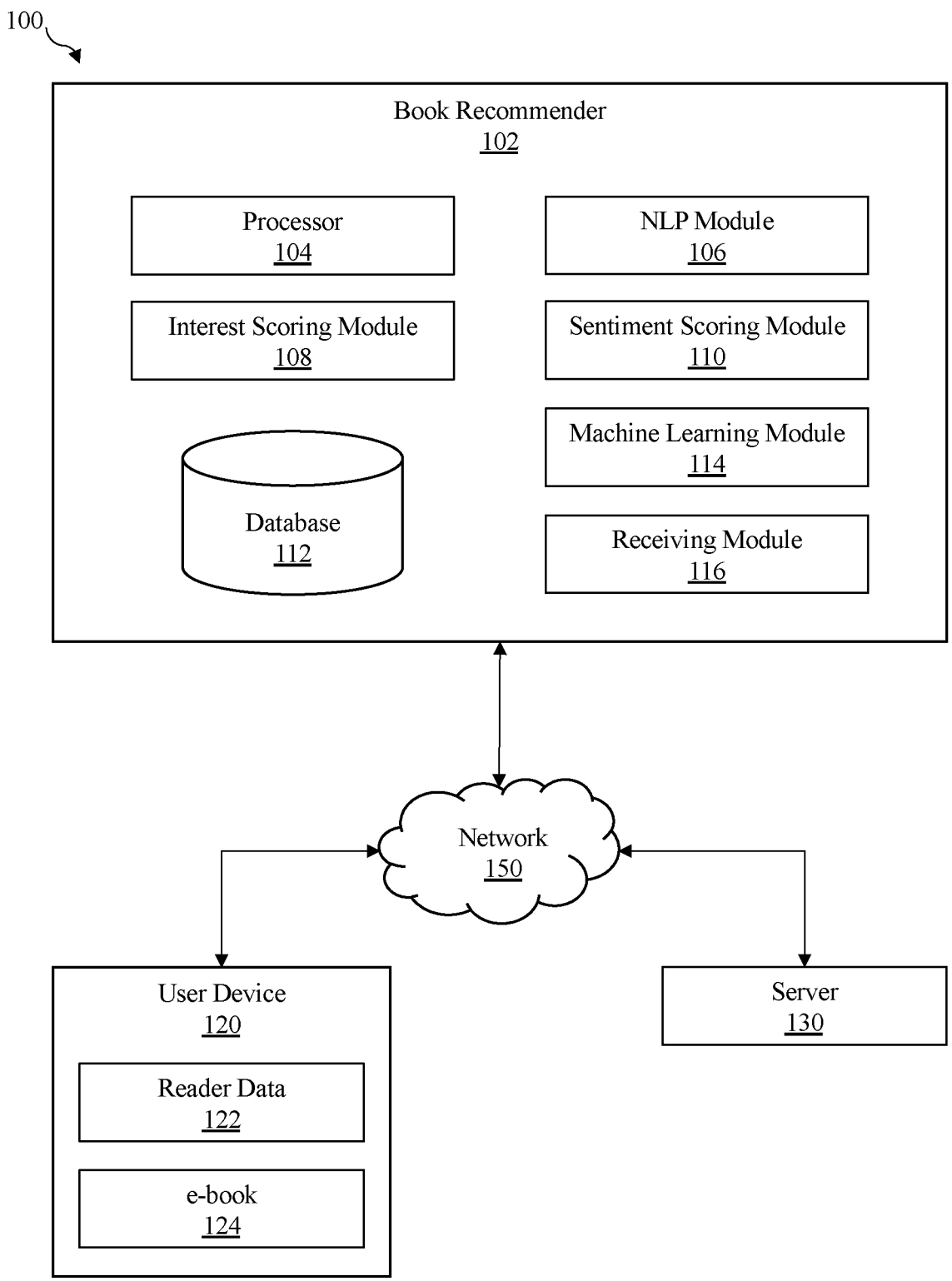
FIG. 1 illustrates a block diagram of a book recommendation system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of analyzing electronic documents, and more particularly to analyzing electronic books (e-books) using sentimental and emotional analysis to generate book recommendations for one or more users. While the present disclosure is not necessarily limited to such applications, various aspects of the disclosure may be appreciated through a discussion of various examples using this context.

A book recommendation system may use sentimental and emotional analysis of textual content of e-books to determine signature profiles for each book. For example, the book recommendation system may evaluate various sections of the e-books using metadata related to reading habits of multiple readers indicating where the readers have been determined to be engrossed in the textual content. The system may evaluate the "feel" of these sections by using natural language analysis to determine sentiment and emotion of the textual content. Using the resulting data, the book recommendation system can compare similar signature profiles of e-books to make recommendations to readers for books that have the same "feel."

In some instances, the book recommendation system may augment traditional book reviews by linking the signature profiles of the e-books to the traditional reviews to provide readers additional information when making the recommendation. Using the augmented reviews, the system may generate a list of the most similar books based on emotional content. The advantage of using both sentiment and emotion analysis to analyze and recommend books is that it captures the "feel" of the book as opposed to other systems that may only take into consideration of metadata or specific reviews generated by human reviewers.

In embodiments, the book recommendation system may collect reader data related to a plurality of electronic books (e-book) from a plurality of user devices. The reader data is representative of reading habits of a plurality of users. For example, the reader data may comprise metadata related to the various metrics, such as the amount of time users remain on each page of each e-book, how fast users cycle through each e-book and/or sections of each e-book, areas where users have highlighted pertinent parts (e.g., sentences, paragraphs, etc.) of each e-book, the frequency users return to various sections of each e-book, and the like. The reader data may be collected from multiple user devices (e.g., electronic readers (e-readers), tablets, smartphones, etc.) that were used by each respective user when reading each e-book. In embodiments, the reader data may be stored on a database (e.g., a cloud database) and analyzed by the book recommendation system.

In embodiments, the book recommendation system may use the reader data to determine an interest score for each section of a plurality of sections of each e-book. The interest score is indicative of interest of the plurality of users when reading each section. For example, the interest score may be a numerical score and/or any combination/summation of the metadata metrics listed above. For example, the interest score may comprise various values such as numerical time values for where the metadata indicates the user spent a significant amount of time on a respective page or section.

For example, the book recommendation system may determine a score for each section of each e-book based on some linear combination of the metadata metrics that have been collected (e.g. 120 seconds spent on a page+2 times a user flipped back to the page+5 highlighted sections on the page). It is noted that the actual combination does not have to be linear and may be any combination of various types of metadata available from each user device. By accumulating the reader data across all e-readers, the book recommendation system may determine an interest score for the plurality of sections of each e-book using the metadata metrics. The plurality of sections may be spread over the length of the book. In embodiments, the sections may be in the form of pages or paragraphs of the book. For example, metadata may indicate that a user reading a self-help book has reread various passages of the book. This may indicate these sections are interesting to the user and therefore the interest score may be increased.

In embodiments, once all sections of each e-book have a respective interest score, the book recommendation system may identify a set of sections from the plurality of sections of each e-book that meet a predetermined interest score threshold (e.g., top 10 scores, top 100, a range, etc.). For example, for each e-book the book recommendation system may identify the N most interest sections (e.g., pages, paragraphs, sentences, etc.) using the interest scores. In embodiments, the book recommendation system may average interest scores across all user devices (e.g., e-readers) and identify a set of sections having the highest sectioned values.

In embodiments, once the set of sections meeting the predetermined interest score threshold is identified, the book recommender may analyze the set of sections for each e-book to determine a sentimental score for each section. In embodiments, the book recommender may apply natural language analysis (e.g., natural language processing (NLP), emotional analysis, sentimental analysis, etc.) to the textual content of each identified section to determine the sentimental score.

In embodiments, the sentimental score may comprise a polarity score and an emotional score. For example, the polarity score may comprise values indicating positive, negative, or neutral textual content for each section (e.g., +1 for positive, −1 for negative, and 0 for neutral).

In embodiments, the emotional score may comprise a plurality of emotion scores related to emotion found within the textual content of each identified section. In embodiments, the plurality of emotion scores may be generated when detecting anger, disgust, fear, joy, and sadness conveyed in the textual content. For example, a value may be determined for each emotion related to each section. For example, a disturbing or tragic paragraph of an e-book may be analyzed using natural language analysis. The system may determine emotion scores for anger, disgust, and fear that have high values (e.g., 8 or 9 on a scale of 1-10), while scores for joy and sadness may be given low values (e.g., 2 or 3) based on textual content of the paragraph. In embodiments, the overall sentimental score for each section may comprise 6 scores (e.g., one for polarity and 5 emotion scores). In other embodiments, it is contemplated that more or less than 5 emotion scores (e.g., 10 emotional scores corresponding to other determined emotional states, 4 emotion scores, etc.) may be determined depending on the system and is not meant to be limiting.

In embodiments, the book recommendation system may generate a scoring matrix using the interest score and the sentimental score for each section of the set of sections of each e-book. For example, the book recommendation system may use both the interest score (scores for the N most interest sections) and the M sentimental scores (e.g., 6 scores) for each section to generate six N point vectors (e.g., a N×M matrix).

In embodiments, the book recommendation system may compare scoring matrices generated for each e-book of the plurality of e-books. From the comparison, the system may identify two or more e-books having similar scoring matrices (e.g., a similarity between the scoring matrices is within a threshold). In embodiments, the book recommendation system may use any available techniques for comparing matrices and/or vectors (e.g., matched filtering, principal component analysis, etc.). For example, the book recommendation system may use Euclidean distance to compare the scoring matrices of each e-book to find the most similar books to any given book. Euclidean distance is the straight-line distance between two points in a Euclidean space. In some embodiments, the interest score may act as a weight for each of the associated sentimental scores, and the system may be configured to compare the weighted matrices.

In some embodiments, the book recommender may generate a trend vector for each book to identify trends related to interest of readers for various sections of the books and the emotional/sentimental content found within each book using the data generated by the system. For example, the trend vector may indicate that a book begins with sadness (e.g., using sentimental scoring) in an interesting early section (e.g., interest scoring), has middle sections including fear and anger, and ends with a happiness in a final section (e.g., fairy tale ending). In this way, the book recommender may further identify books with similar trends in interest and emotion in addition to the comparison of the scoring matrices.

In embodiments, the system may provide a recommendation to one or more users related to the identified two or more e-books. For example, a user may enjoy reading crime novels. The book recommendation system may use the scoring matrices of a crime novel e-book read by a user and compare it to other e-books from the same genre. Using scoring matrices of other e-books, the system may identify one or more similar crime novels having similar scoring matrices. In this way, the system may recommend books to the user by identifying books that have the same feel by easily comparing the scoring matrices between books using signal processing techniques to find closest matches to other scoring matrices. In some embodiments, the recommendation may include a plurality of similar books. The plurality of similar books may be books that have a scoring matrix within a similarity threshold to the target book (e.g., within a threshold distance to the scoring matrix of the book it is being compared to).

In embodiments, the book recommendation system may analyze current book reviews (e.g., book review/recommendations from a website, internet service, etc.) that are related to the identified two or more e-books having similar scoring matrices. For example, the book recommendation system may identify book reviews (e.g., using titles of the books) from the internet that match the identified e-books having similar matrices. The book recommendation system may correlate the book reviews with the identified two or more e-books and augment the recommendation based on the correlating. For example, the book recommendation system may analyze the textual content of the book review to determine if the review correlates to the scoring matrices of the identified e-books. If the book review contains additional information or alternative information (e.g., the book review describes a book as positive and/or joyful while the scoring matrices indicates the opposite), the system may augment the recommendation (e.g., include the additional or alternative information and/or adjust the scoring matrices). In this way, the book recommendation system will take into account book reviews written by actual readers when generating the book recommendation.

The aforementioned advantages are example advantages, and not all advantages are discussed. Furthermore, embodiments of the present disclosure can exist containing all, some, or none of the aforementioned advantages while remaining within the spirit and scope of the present disclosure.

With reference now to FIG. 1, shown is a block diagram of a book recommendation system 100, in accordance with embodiments of the present disclosure. In the illustrated embodiment, book recommendation system 100 includes book recommender 102 that is communicatively coupled to user device 120 and server 130 via network 150. It is contemplated that user device 120 is operated by one or more users within the book recommendation system 100. User device 120 may be any type of device (e.g., computer, smartphone, tablet, electronic reader (e-reader), etc.) configured to display electronic book (e-book) 124. Book recommender 102, user device 120, and server 130 may be any type of computer system and may be substantially similar to computer system 1101 of FIG. 5.

In embodiments, network 150 may be any type of communication network, such as a wireless network or a cloud computing network. Network 150 may be substantially similar to, or the same as, cloud computing environment 50 described in FIG. 6 and FIG. 7. In some embodiments, network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium.

For example, book recommender 102 may communicate with user device 120 and/or server 130 using a WAN, one or more hardwire connections (e.g., an Ethernet cable) and/or wireless communication networks. In some embodiments, the various systems may be communicatively coupled using a combination of one or more networks and/or one or more local connections. For example, book recommender 102 may communicate with server 130 using a hardwired connection, while communication between the book recommender 102 and user device 120 may be through a wireless communication network.

In the illustrated embodiment, book recommender 102 includes processor 104, natural language processing (NLP) module 106, interest scoring module 108, sentiment scoring module 110, database 112, machine learning module 114, and receiving module 116. In embodiments, book recommender 102 may be configured as a software application accessible through a user interface on one or more user devices, servers, and/or computer systems. In embodiments, book recommender 102 may be accessible through an internet service (e.g., website). In embodiments, book recommender 102 may collect and analyze reader data 122 generated by user device 120 when one or more users read e-book 124. Reader data 122 may be any type of data or metric. For example, reader data 122 may include one or more metrics such as length of time a user remains on each page of e-book 124, a rate the user cycles through pages of e-book 124, number of highlighted areas within e-book 124, and frequency amount related to the user revisiting one or more sections of e-book 124. The above list includes examples of reader data 122 metrics and is not meant to be limiting.

In some embodiments, other metadata/metrics may be collected. For example, user device 120 may be configured to track eye movement via image recognition, such that eye tracking data may be utilized to determine the interest by a reader by how focused the user's eyes are when reading various sections of the e-book. In another embodiment, data generated from a communicatively coupled IoT device may be used to determine various biometric data while reading e-book 124. For example, the pulse rate of a user may be tracked via a smartwatch to determine when a user is engrossed (e.g., higher pulse rate while reading an action scene) in a particular section of the e-book.

In embodiments, interest scoring module 108 is configured to determining an interest score for each section of e-book 124 using the reader data 122. The interest score is indicative of interest by a user when reading various sections of e-book 124. In embodiments, each section of e-book 124 may comprise pages, paragraphs, sentences, and/or words within the e-book and is not meant to be limiting. In embodiments, the interest scoring module 108 may determine a set of sections that meet a predetermined interest score threshold. For example, the interest scoring module 108 may analyze all the interest scores for each section of the e-book over the length of the e-book to determine the N most interest scores (e.g., where the user was most interested in the book). The N most interest scores may meet any type of predetermined interest score threshold (e.g., top 15 scores, top 50 interest scores). For example, the interest threshold may be adjusted to include more scores from additional sections by increasing the amount of scores used to determine N interest sections, thus increasing sensitivity of interest scoring module 108.

In embodiments, receiving module 116 is configured to receive raw textual content (e.g., textual content from the set of sections that are most interest for e-book 124) and send the textual content in the form of unstructured textual documents/transcripts (e.g., "electronic documents") to be analyzed by the NLP module 106.

In embodiments, natural language processing (NLP) module 106 is configured to analyze textual content from the set of sections of e-book 124 that meet the predetermined interest score threshold. In embodiments, NLP module 106 may be substantially similar to natural language processing system 412 detailed in FIG. 4. For example, NLP module 106 may analyze the textual content of each section that was found to be most interesting based on the reader data. Utilizing the interest score threshold reduces the amount of textual content analyzed by NLP module 106, thereby reducing processing time and preventing latency issues.

In embodiments, sentiment scoring module 110 is configured to determine a sentimental score for each section of the set of sections meeting the interest score threshold. In embodiments, the sentiment scoring module 110 may utilize NLP module 106 when determining sentimental scores by applying natural language analysis to the textual content of the set of sections to detect sentiment and emotion. In embodiments, the sentimental score may comprise multiple scores for each section. For example, the sentimental score may comprise a polarity score related to sentiment and five emotion scores related to emotions found within the textual content.

In embodiments, book recommender 102 may generate scoring matrices for each of the most interest sections of e-book 124 by using both the interest score and the sentimental score for each section. Book recommender 102 may compare the scoring matrices of multiple e-books to determine similar books that contain a similar "feel." Once similar books are identified, the book recommender 102 may provide a recommendation to a user suggesting a book based on the similarities. For example, a user may request a book recommendation for a book that is similar to a romance e-book the user previously read. The book recommender system 100 may utilize database 112 to identify one or more e-books that have similar scoring matrices related to the romance e-book the user read. Once identified, the book recommender 102 may suggest one or more e-books that are similar to the romance e-book. For example, the book recommender 102 may produce a list of romance e-books that match similar plot lines and/or feelings (e.g., suspenseful beginnings, sad midpoints, joyful endings, etc.) as indicated by their associated scoring matrices.

In embodiments, server 130 is configured to store any data generated by book recommendation system 100. For example, server 130 may store reader data 122 generated from a plurality of users when reading a plurality of e-books that has been analyzed by recommender 102. In embodiments, book recommender 102 may be hosted by server 130. In embodiments, database 112 may be located on server 130 and accessed by book recommender 102 and/or user device 120.

In embodiments, machine learning module 114 may comprise various machine learning engines (artificial neural network, correlation engines, reinforcement feedback learning model, supervised/unsupervised learning model, etc.) configured to analyze data generated from the book recommendation system 100. In embodiments, machine learning module 114 may analyze reader data 122 generated from user device 120 and/or scoring data generated from interest scoring module 108 and sentiment scoring module 110. In embodiments, the machine learning module 114 may utilize a feedback learning model to collect user data in response to receiving book recommendations for one or more e-books. The machine learning module 114 may determine, based on user response data, whether the book recommendation generated by the system was accurate in suggesting various books that the user found appealing (e.g., user indicated they enjoyed the recommended book). Over time, the book recommender 102 may utilize machine learning module 114 to become more accurate in properly recommending books based on user responses.

FIG. 1 is intended to depict the representative major components of book recommendation system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with book recommendation system 100 may not be present, and the arrangement of components may vary.

For example, while FIG. 1 illustrates an example book recommendation system 100 having a single book recommender 102, a single user device 120 and a single server 130, suitable network architectures for implementing embodiments of this disclosure may include any number of book recommenders, user devices, and servers. The various models, modules, systems, and components illustrated in FIG. 1 may exist, if at all, across a plurality of book recommenders, user devices (operated by a plurality of users), and servers. For example, the book recommender 102 may be implemented within server 130 and/or user device 120.

Figure 2:
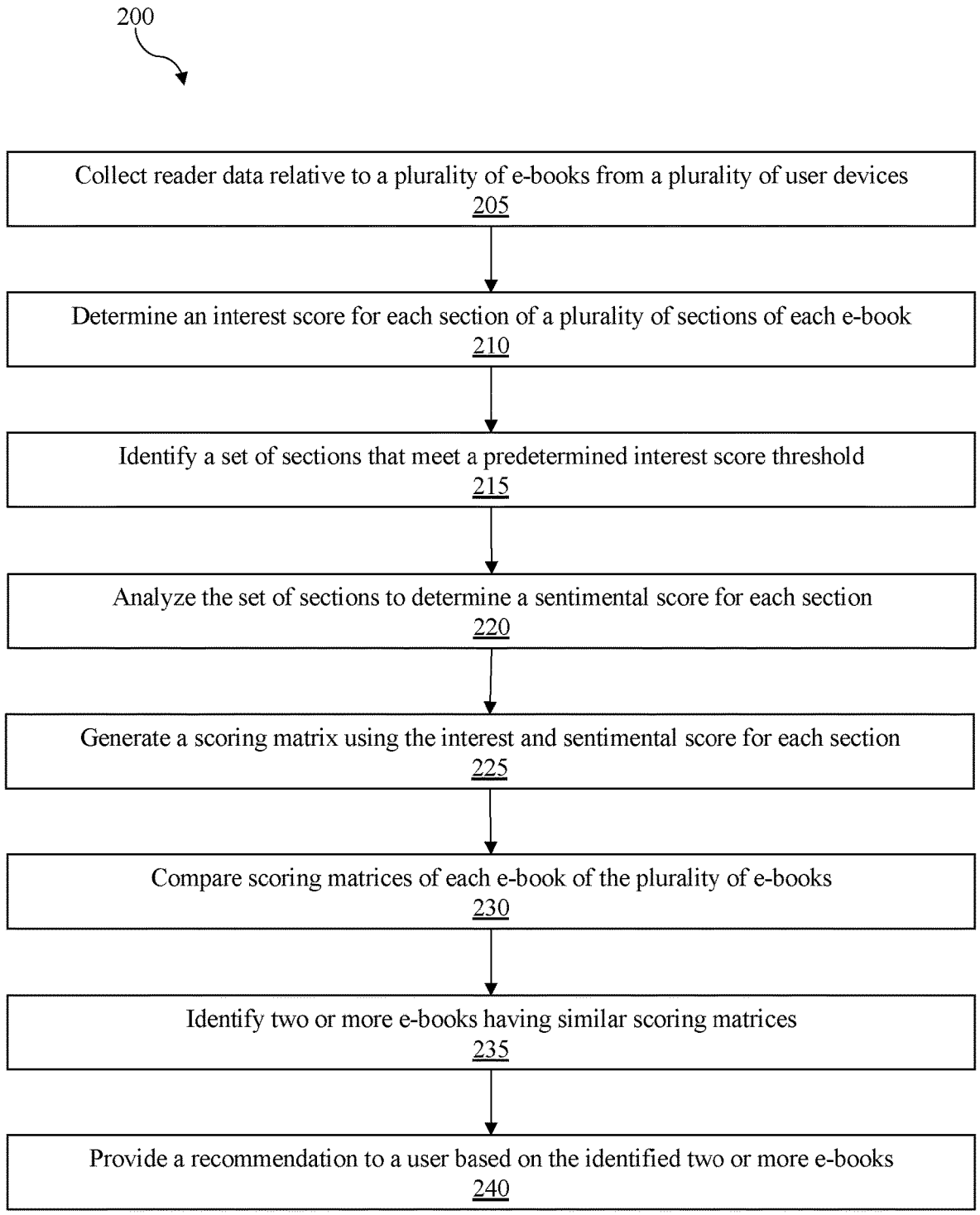
FIG. 2 illustrates a flow diagram of an example process for providing a book recommendation using sentimental and emotional analysis, in accordance with embodiments of the present disclosure.

Referring now to FIG. 2, shown is a flow diagram of an example process 200 for recommending an e-book using sentimental and emotional analysis, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. The process 200 may be performed by processor 104 exemplified in FIG. 1.

The process 200 begins by collecting reader data related to a plurality of electronic books (e-book) from a plurality of user devices. This is illustrated at step 205. In embodiments, the reader data is representative of reading habits of a plurality of users. For example, the reader data may comprise metadata that is generated by measuring a time the plurality of users remain on a page of each e-book, measuring a rate the plurality of users cycle through pages of each e-book, determining one or more areas of each e-book that have been highlighted by the plurality of users, and determining a frequency amount related to the plurality of users revisiting each section of the plurality of e-books.

For example, metadata may indicate multiple users have spent significant time on a specific thought-provoking page/section of an e-book or that users have continually return to this respective page/section. This may indicate the page or section is particularly interesting. In another example, the rate a user reads through pages over a certain time may indicate those pages were engaging since the user did not want to stop reading. For example, metadata may indicate based on time spent on each page over a certain number of pages of the book that the user continued to read at a certain rate. This may be indicative that the user was engrossed in those pages. Alternatively, metadata may indicate a user stopped reading at certain point and never returned to the book which may indicate a user did not like the book. Any type of metadata indicating the reading habits of the user related to each e-book may be gathered by the system.

The process 200 continues by determining an interest score for each section of a plurality of sections of each e-book using the reader data. This is illustrated at step 210. The interest score is indicative of interest of the plurality of users when reading each section. Using the metadata metrics from above, the book recommendation system may determine how engrossing/interesting each section of each e-book was on average for the plurality of users.

For example, the book recommendation system may use any combination of metrics (e.g. combing two metrics) to determine the interest score. For example, an interest score for each section (e.g., page, paragraph, etc.) of each e-book may be determined by taking into account the time spent on the page, the amount of times the user returned to the page, and/or the number of highlighted passages on the page. By determining the interest score for each section, the book recommendation system may track the interest level of each user over the length of the book. For example, the interest score for action scenes in a suspense novel may contain high values, while scenes with little action or suspense may have low values. In another example, if users on average did not finish the book based on metadata, this may negatively affect the interest score of various sections.

The process 200 continues by identifying a set of sections from the plurality of sections of each e-book that meet a predetermined interest score threshold. This is illustrated at step 215. For example, the book recommendation system may analyze all interest scores from each section of the e-books and determine which sections of the e-books have the highest scores. The highest scores are indicative of the most interesting parts of each book. The system may determine this by including a threshold or range (e.g., top 5 sections, minimum interest score of 8 out of 10, etc.).

The process 200 continues by analyzing the set of sections to determine a sentimental score for each section. This is illustrated at step 220. Once the most interesting sections of each e-book are determined, the book recommendation system analyzes each of these sections using natural language analysis to detect sentiment and emotion from the textual content to generate a sentimental score for each section. In embodiments, the sentimental score may comprise a polarity score (e.g., positive, negative, neutral) and a plurality of emotion scores (e.g., anger, disgust, sadness, fear, and joy). Generating the sentimental score is further detailed in process 300 of FIG. 3.

The process 200 continues by generating a scoring matrix using the interest score and the sentimental score for each section of the set of sections of each e-book. This is illustrated at step 225. In embodiments, the scoring matrix may be any type of matrix (e.g., a N×M matrix). For example, the scoring matrix for each e-book may include the interest scores of the 10 most interesting sections of the e-book, where each of the 10 sections has a sentimental score comprising of 6 scores (e.g., a polarity score and 5 emotion scores).

The process 200 continues by comparing scoring matrices of each e-book of the plurality of e-books. This is illustrated at step 230. The book recommendation system will determine which e-books contain the most similar scoring matrices by comparing all scoring matrices generated for all e-books analyzed by the system. The scoring matrices for the plurality of e-books may be stored on a database that is accessible by the book recommender system.

The process 200 continues by identifying two or more e-books having similar scoring matrices. This is illustrated at step 235. In embodiments, the book recommendation system may use various comparison techniques (e.g., matched filtering, principal component analysis, etc.) to determine the most similar scoring matrices. In embodiments, the system may measure a Euclidean distance between values of a first scoring matrix of a first e-book to values of scoring matrices associated with the plurality of e-book to identify a second scoring matrix related to a second e-book by determining a shortest distance between the values of the first scoring matrix of the first e-book and the values of the scoring matrices associated with the plurality of e-books.

Once the book recommender identifies two or more books with similar scoring matrices, the process 200 continues by providing a recommendation to one or more users based on the identified two or more e-books. This is illustrated at step 240. For example, a user may request a book recommendation from the book recommendation system. The book recommendation system may determine (e.g., through reader data from the user device or through user input) that a user has read a crime novel and recommend one or more other crime novel e-books that have similar scoring matrices. In this way, the book recommendation system may recommend books that are not only in the same genre but also have a similar feel to what the user has previously read and preferred.

In embodiments, the book recommendation may be augmented by various book reviews received from the internet. In embodiments, the book recommendation system may analyze a plurality of book reviews (e.g., reviews written by users) from an internet service (e.g., book review website, online book store, etc.) that correspond to the identified e-books having substantially similar scoring matrices. For example, the system may identify the book reviews by using the titles of the e-books that were identified by the system. The book recommendation system may correlate the plurality of book reviews with the identified e-books and augment the recommendation based on the correlating.

For example, the book recommendation system may analyze the textual content of the book review to determine if the review correlates to the scoring matrices of the identified e-books. If the book review contains additional information or alternative information (e.g., the book review describes a book as positive and/or joyful while the scoring matrices indicates the opposite) the system may augment the recommendation (e.g., include the additional or alternative information and/or adjust the scoring matrices). In this way the book recommendation system will take into account book reviews written by actual readers when generating the book recommendation.

Figure 3:
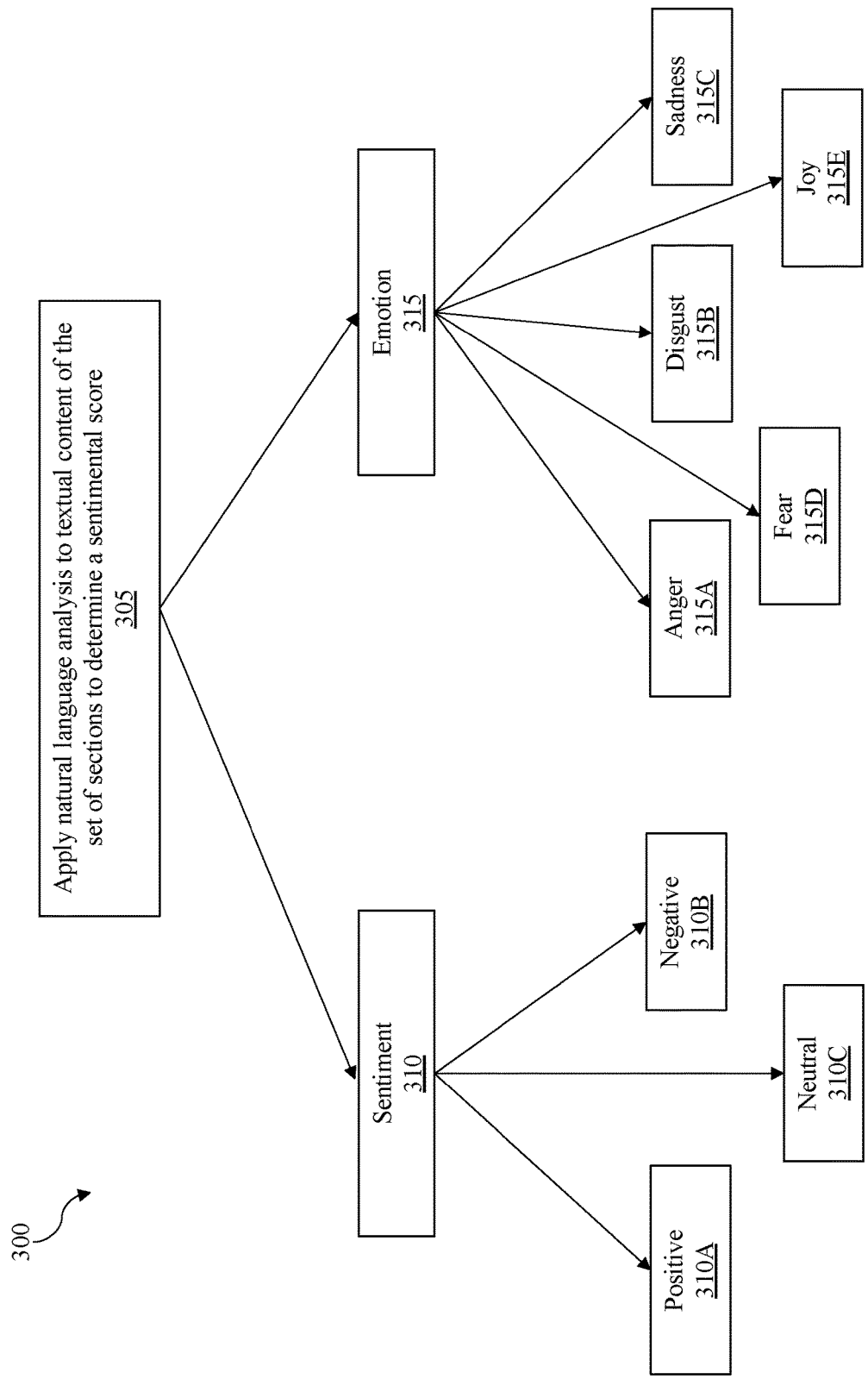
FIG. 3 illustrates a flow diagram of an example process for determining sentimental scores for a set of sections of an e-book, in accordance with embodiments of the present disclosure.

Referring now to FIG. 3, shown is a flow diagram of an example process 300 for determining sentimental scores for a set of sections of an e-book, in accordance with embodiments of the present disclosure. In embodiments, process 300 may be in addition to or a subset of process 200. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. The process 300 may be performed by processor 104 exemplified in FIG. 1.

The process 300 begins by applying natural language analysis (e.g., NLP, sentiment analysis, emotion analysis, etc.) to textual content of the set of sections of each e-book to determine a sentimental score. This is illustrated at step 305. The set of sections contain the most interest sections of each e-book that met a predetermined interest score threshold. The sentimental score may be determined by analyzing each section of the set of sections using sentiment (step 310) and emotion (step 315) analyses. The process 300 continues by detecting sentiment from the textual content of each section. This is illustrated at step 310. In embodiments, sentiment may detect by generating polarity scores for the textual content of each section. In the illustrated embodiment, the polarity score of the textual content may determine to be positive (step 310A), negative (step 310B), and/or neutral (310C). For example, textual content determined to contain positive language as determined by natural language analysis will be given positive scores (e.g., +1), while negative language will be given negative scores (e.g., −1). Neutral language will be given no score or zero.

The process 300 continues by detecting emotion from the textual content from each section. This is illustrated at step 315. In embodiments, emotion may be detected by generating a plurality of emotion scores for various types of emotion found in the textual content. In the illustrated embodiment, to generate each emotion score for the textual content the system may analyze words to detect anger (step 315A), disgust (step 315B), sadness (step 315C), fear (step 315D), and joy (step 315E). Each section may be given a score for each of the emotions. For example, a happy passage full of words indicating joy (e.g., happy, love, beautiful, etc.) will be given a high joy score (e.g., 10), while scores for anger, disgust, sadness, and fear for the respective section will be given minimal scores (e.g., 0 or 1). The polarity score and the 5 emotional scores will be determined for each of the most interesting sections of each e-book. Once all sections have their respective scores, the system may generate scoring matrices using the interest and sentimental scores for the plurality of e-books which is detailed in FIG. 2. Using the sentimental scores for the most interesting parts of the book provide a glimpse of the feel of the book. For example, a fairy tale may include interesting sections (as determined by the interest score for each section) over the length of the book where a beginning section includes the highest scores for sadness, a middle section includes the highest scores for fear and anger, and a ending section includes the highest scores for joy (e.g., a happy fairy tale ending). The scoring matrix for the fairy tale book may be compared to other books that follow similar plot lines having the same type of feelings and interest patterns. Using the comparison of the scoring matrices allows the system to recommend similar books a user would enjoy. In embodiments, the system may further generate a trend vector for each book using the available data. Once generated, the system may compare each trend vector to determine which books have similar trends.

Figure 4:
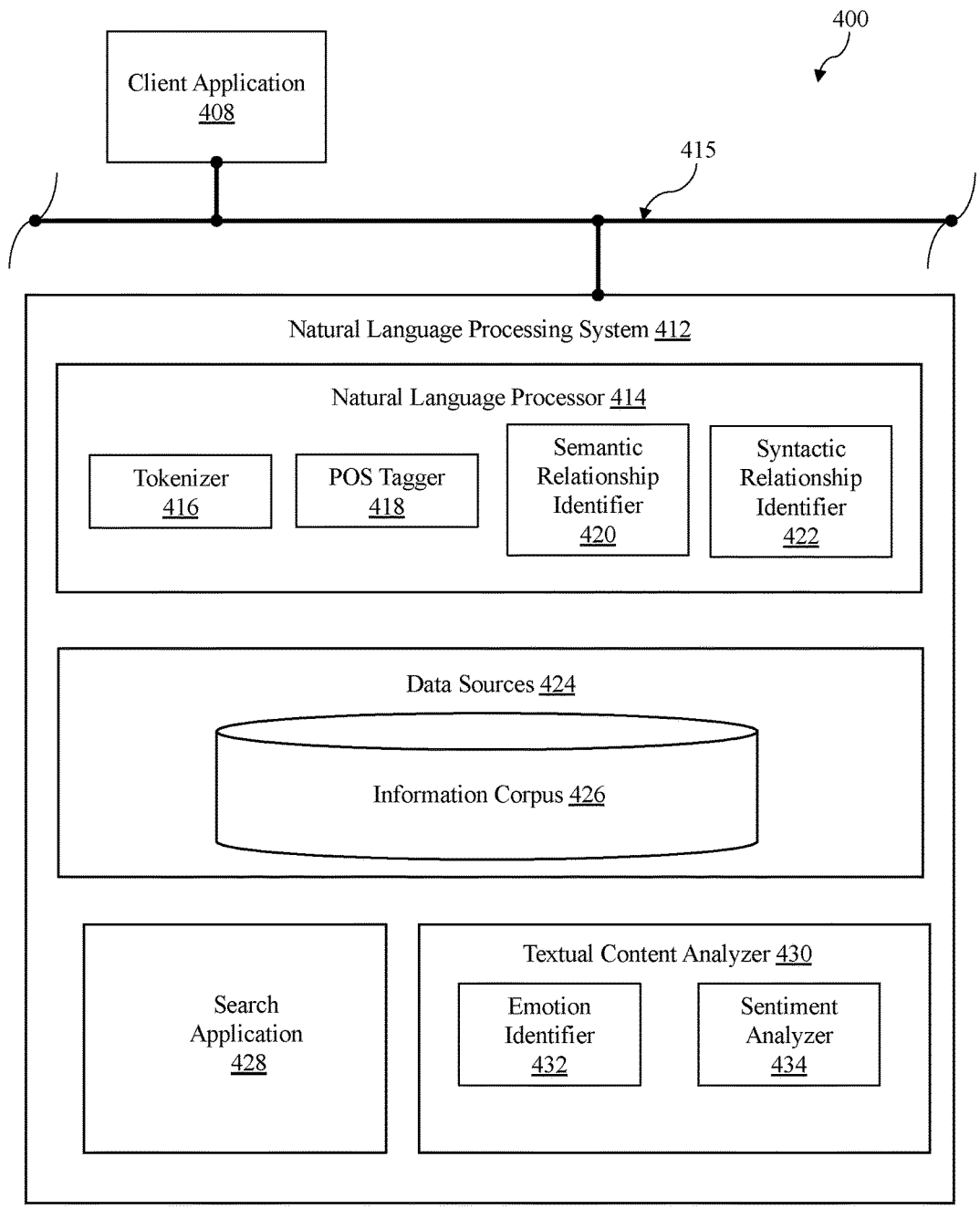
FIG. 4 illustrates a block diagram of an example natural language system configured to analyze textual content of an e-book, in accordance with embodiments of the present disclosure.

Referring now to FIG. 4, shown is a block diagram of an example natural language system 400 configured to analyze textual content of an e-book, in accordance with embodiments of the present disclosure. In some embodiments, a receiving module (such as receiving module 116 of FIG. 1) may receive raw textual data (e.g., textual content/artifacts from one or more sections of an e-book) and send them in the form of unstructured textual documents/transcripts (e.g., "electronic documents") to be analyzed by the natural language system 400 which may be a standalone device, or part of a larger computer system. Such a natural language system 400 may include a client application 408, which may itself involve one or more entities operable to generate or modify information in the unstructured textual document(s) (e.g., analog or electronic textual content artifacts) that is then dispatched to a natural language processing system 412 via a network 415.

Consistent with various embodiments, the natural language processing system 412 may respond to electronic document submissions sent by a client application 408. Specifically, the natural language processing system 412 may analyze a received unstructured textual document (e.g., e-book) to identify one or more terms associated with sentiment and emotion. In some embodiments, the natural language processing system 412 may include a natural language processor 414, data sources 424, a search application 428, and a textual content analyzer 430. The natural language processor 414 may be a computer module that analyzes the received unstructured textual content (e.g., e-books) and other electronic documents. The natural language processor 414 may perform various methods and techniques for analyzing electronic documents (e.g., syntactic analysis, semantic analysis, emotional analysis, etc.). The natural language processor 414 may be configured to recognize and analyze any number of natural languages. In some embodiments, the natural language processor 414 may parse passages of the documents. Further, the natural language processor 414 may include various modules to perform analyses of electronic documents. These modules may include, but are not limited to, a tokenizer 416, a part-of-speech (POS) tagger 418, a semantic relationship identifier 420, and a syntactic relationship identifier 422.

In some embodiments, the tokenizer 416 may be a computer module that performs lexical analysis. The tokenizer 416 may convert a sequence of characters into a sequence of tokens. A token may be a string of characters included in an electronic document and categorized as a meaningful symbol. Further, in some embodiments, the tokenizer 416 may identify word boundaries in an electronic document and break any text passages within the document into their component text elements, such as words, multiword tokens, numbers, and punctuation marks. In some embodiments, the tokenizer 416 may receive a string of characters, identify the lexemes in the string, and categorize them into tokens.

Consistent with various embodiments, the POS tagger 418 may be a computer module that marks up a word in passages to correspond to a particular part of speech. The POS tagger 418 may read a passage or other text in natural language and assign a part of speech to each word or other token. The POS tagger 418 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed electronic documents. In embodiments, the output of the natural language processing system 412 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 418 may assign include, but are not limited to, comparative or superlative adverbs, wh-adverbs, conjunctions, determiners, negative particles, possessive markers, prepositions, wh-pronouns, and the like. In some embodiments, the POS tagger 418 may tag or otherwise annotate tokens of a passage with part of speech categories. In some embodiments, the POS tagger 418 may tag tokens or words of a passage to be parsed by the natural language processing system 412.

In some embodiments, the semantic relationship identifier 420 may be a computer module that may be configured to identify semantic relationships of recognized text elements (e.g., words, phrases) in documents. In some embodiments, the semantic relationship identifier 420 may determine functional dependencies between entities and other semantic relationships.

Consistent with various embodiments, the syntactic relationship identifier 422 may be a computer module that may be configured to identify syntactic relationships in a passage composed of tokens. The syntactic relationship identifier 422 may determine the grammatical structure of sentences such as, for example, which groups of words are associated as phrases and which word is the subject or object of a verb. The syntactic relationship identifier 422 may conform to formal grammar.

In some embodiments, the natural language processor 414 may be a computer module that may parse a document and generate corresponding data structures for one or more portions of the document. For example, in response to receiving an unstructured textual report at the natural language processing system 412, the natural language processor 414 may output parsed text elements from the report as data structures. In some embodiments, a parsed text element may be represented in the form of a parse tree or other graph structure. To generate the parsed text element, the natural language processor 414 may trigger computer modules 416-422.

In some embodiments, the output of natural language processor 414 may be used by search application 428 to perform a search of a set of (e.g., one or more) corpora to retrieve information regarding content artifacts and/or media. As used herein, a corpus may refer to one or more data sources. In some embodiments, the data sources 424 may include data warehouses, information corpora, data models, and document repositories. In some embodiments, the data sources 424 may include an information corpus 426. The information corpus 426 may enable data storage and retrieval. In some embodiments, the information corpus 426 may be a storage mechanism that houses a standardized, consistent, clean, and integrated list of conversation topics and/or emotional sentiments. Data stored in the information corpus 426 may be structured in a way to specifically address reporting and analytic requirements. In some embodiments, the information corpus 426 may be a data repository, a relational database, triplestore, or text index.

In some embodiments, the textual content analyzer 430 may be a computer module that identifies sentiment and emotion within textual content. In some embodiments, the textual content analyzer 430 may include an emotion identifier 432 and a sentiment analyzer 434. When an unstructured textual document is received by the natural language processing system 412, the textual content analyzer 430 may be configured to analyze the document using natural language processing to identify a plurality of emotions and sentiment. For example, the textual content analyzer 430 may utilize emotion identifier 432 to analyze textual content to identify anger, disgust, fear, joy, and sadness conveyed in the textual content. In embodiments, textual content analyzer 430 may utilize sentiment analyzer 434 to detect polarity in textual content. For example, sentiment analyzer 430 may detect whether textual content contains positive, negative, or neutral content.

Figure 5:
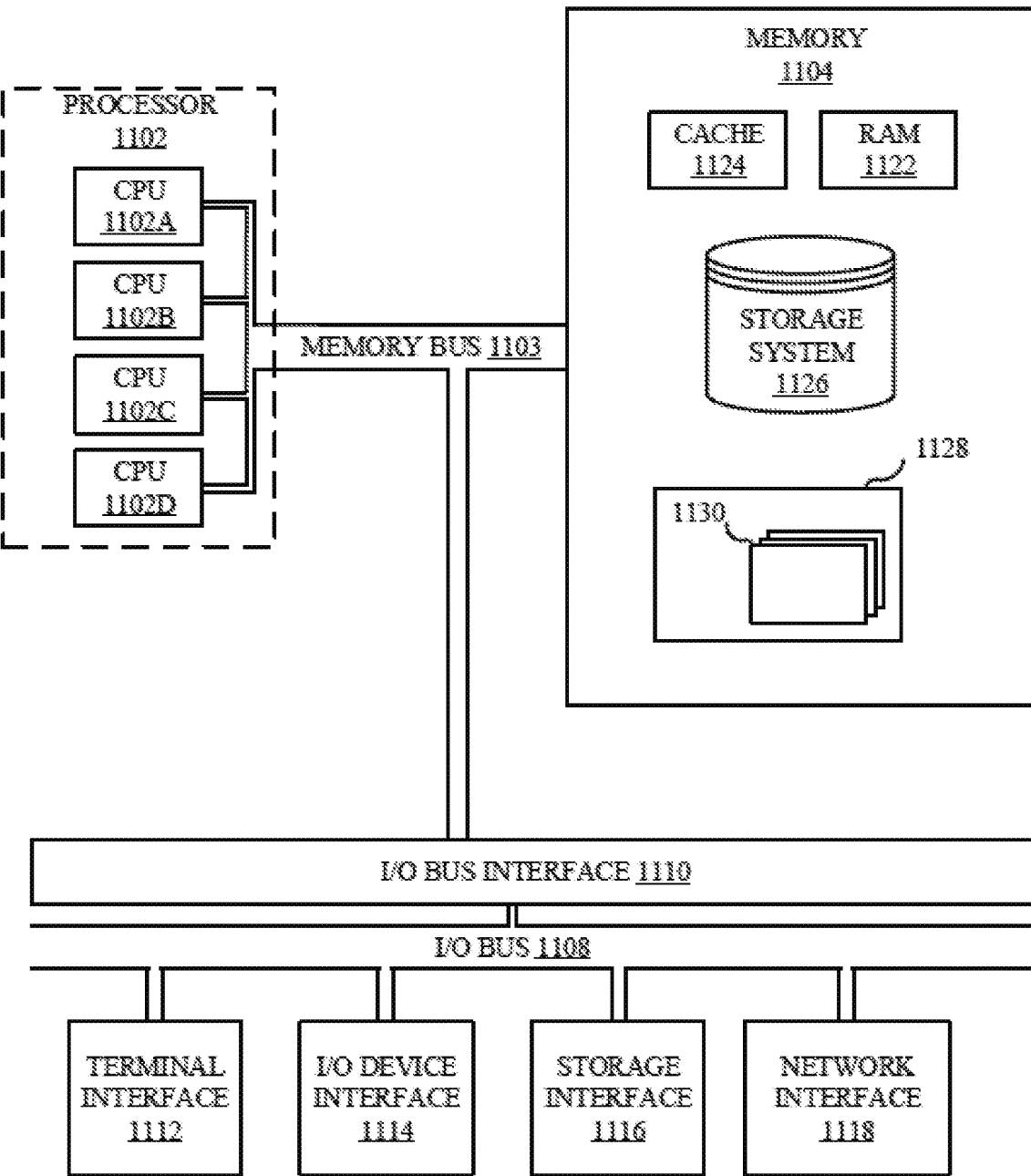
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatedly large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200 and 300).

System memory subsystem 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
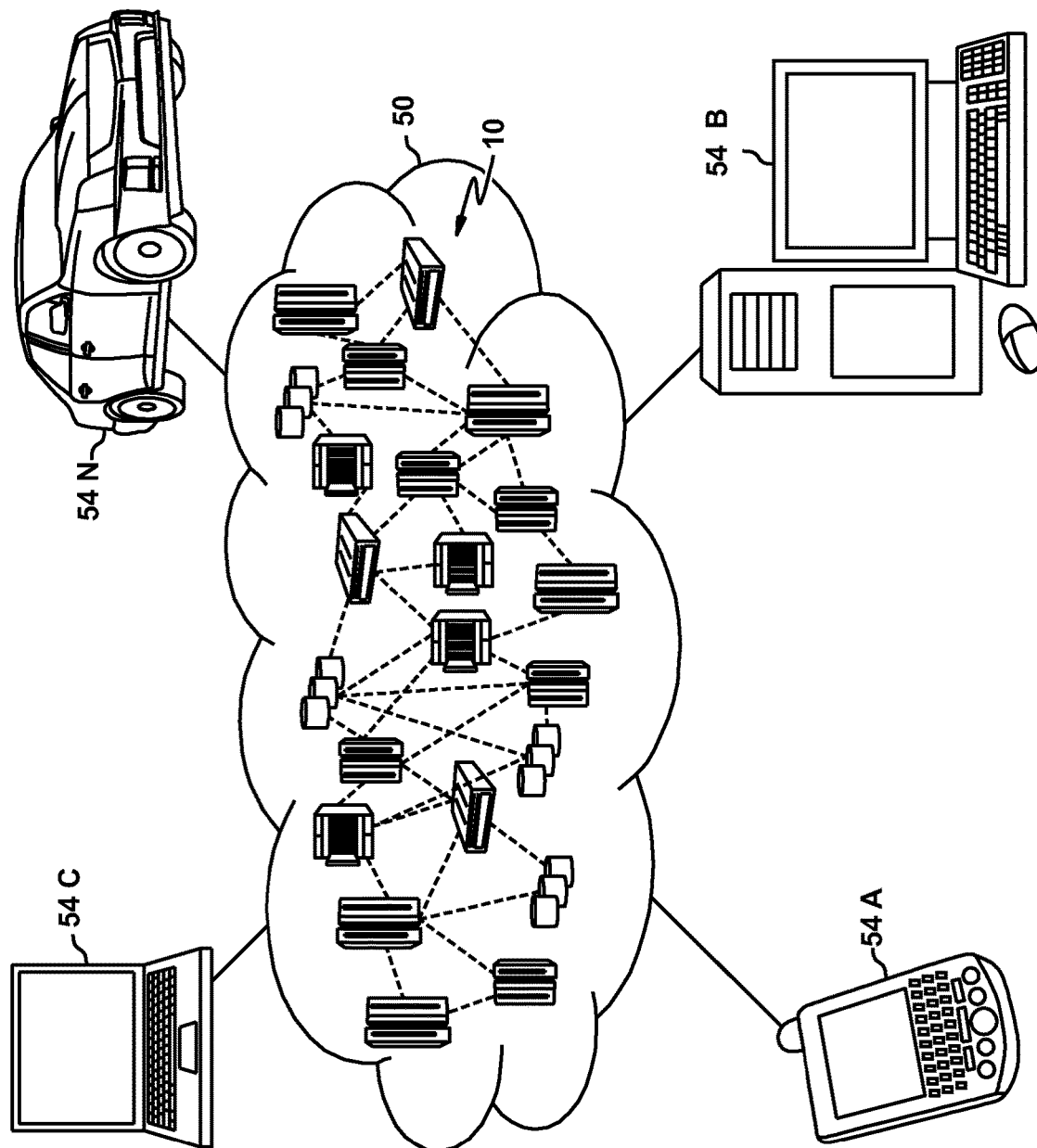
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
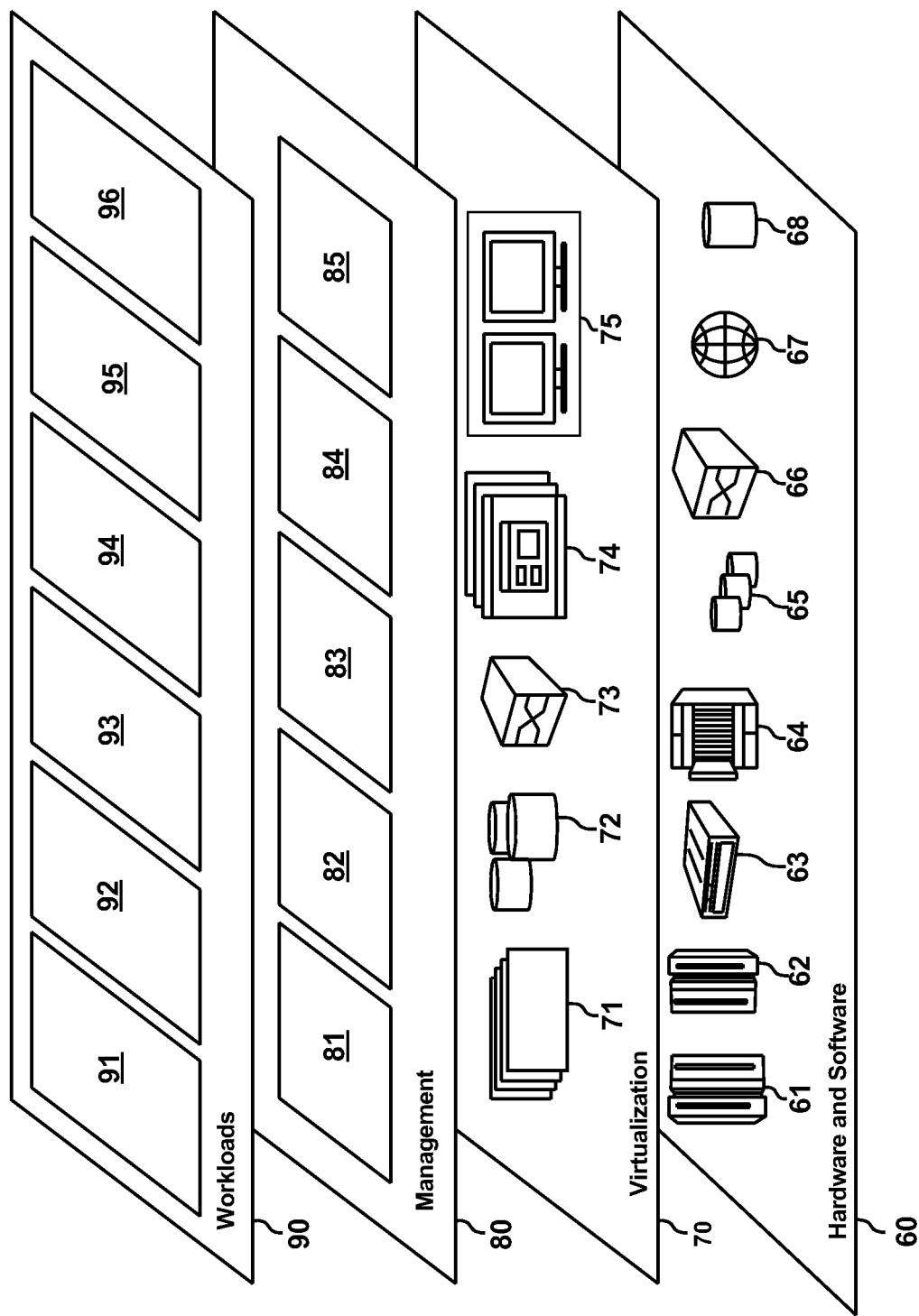
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    collecting reader data related to a plurality of electronic books (e-books) from a plurality of user devices, wherein the reader data is representative of reading habits of a plurality of users;
    determining an interest score for each section of a plurality of sections of each e-book using the reader data, wherein the interest score is indicative of interest of the plurality of users when reading each section;
    identifying a set of sections from the plurality of sections of each e-book that meet a predetermined interest score threshold;
    analyzing the set of sections to determine a sentimental score for each section;
    generating a scoring matrix using the interest score and the sentimental score for each section of the identified set of sections of each e-book;
    comparing scoring matrices of each e-book of the plurality of e-books;
    identifying two or more e-books having similar scoring matrices; and
    providing a recommendation to one or more users based on the identified two or more e-books.

2. The computer-implemented method of claim 1, wherein analyzing the set of sections to determine a sentimental score for each section comprises:
    applying natural language analysis to textual content of the set of sections to detect sentiment and emotion; and
    generating a sentimental score for each section, wherein each section includes a polarity score related to sentiment and a plurality of emotion scores related to emotion found within the textual content.

3. The computer-implemented method of claim 2, wherein the plurality of emotion scores include a score for each of anger, disgust, fear, joy, and sadness conveyed in the textual content.

4. The computer-implemented method of claim 1, wherein identifying two or more e-books having similar scoring matrices further comprises:
    measuring a Euclidean distance between values of a first scoring matrix of a first e-book to values of scoring matrices associated with the plurality of e-books; and
    identifying a second scoring matrix related to a second e-book by determining a shortest distance between the values of the first scoring matrix of the first e-book and the values of the scoring matrices associated with the plurality of e-books.

5. The computer-implemented method of claim 1, wherein collecting reader data related to the plurality of e-books from the plurality of user devices is selected from two or more metrics consisting of:
    measuring a time the plurality of users remain on a page of each e-book;
    measuring a rate the plurality of users cycle through pages of each e-book;
    determining one or more areas of each e-book that have been highlighted by the plurality of users; and
    determining a frequency amount related to the plurality of users revisiting each section of the plurality of e-books.

6. The computer-implemented method of claim 5, wherein determining the interest score for each section of the plurality of sections of each e-book using the reader data comprises combining values of the two or more metrics.

7. The computer-implemented method of claim 1, further comprising:
  analyzing a plurality of book reviews from an internet service, wherein the plurality of book reviews are related to the identified two or more e-books having similar scoring matrices;
  correlating the plurality of book reviews with the identified two or more e-books; and
  augmenting the recommendation based on the correlating.

8. The computer-implemented method of claim 1, wherein the recommendation is further based on comparing trend vectors for the plurality of e-books.

9. A system, comprising:
  a processor; and
  a computer-readable storage medium communicatively coupled to the processor and storing program instructions which, when executed by the processor, cause the processor to perform a method comprising:
    collecting reader data related to a plurality of electronic books (e-books) from a plurality of user devices, wherein the reader data is representative of reading habits of a plurality of users;
    determining an interest score for each section of a plurality of sections of each e-book using the reader data, wherein the interest score is indicative of interest of the plurality of users when reading each section;
    identifying a set of sections from the plurality of sections of each e-book that meet a predetermined interest score threshold;
    analyzing the set of sections to determine a sentimental score for each section;
    generating a scoring matrix using the interest score and the sentimental score for each section of the identified set of sections of each e-book;
    comparing scoring matrices of each e-book of the plurality of e-books;
    identifying two or more e-books having similar scoring matrices; and
    providing a recommendation to one or more users based on the identified two or more e-books.

10. The system of claim 9, wherein analyzing the set of sections to determine a sentimental score for each section comprises:
  applying natural language analysis to textual content of the set of sections to detect sentiment and emotion; and
  generating a sentimental score for each section, wherein each section includes a polarity score related to sentiment and a plurality of emotion scores related to emotion found within the textual content.

11. The system of claim 10, wherein the plurality of emotion scores include a score for each of anger, disgust, fear, joy, and sadness conveyed in the textual content.

12. The system of claim 9, wherein identifying two or more e-books having similar scoring matrices further comprises:
  measuring a Euclidean distance between values of a first scoring matrix of a first e-book to values of scoring matrices associated with the plurality of e-books; and
  identifying a second scoring matrix related to a second e-book by determining a shortest distance between the values of the first scoring matrix of the first e-book and the values of the scoring matrices associated with the plurality of e-books.

13. The system of claim 9, wherein collecting reader data related to the plurality of e-books from the plurality of user devices is selected from two or more metrics consisting of:
  measuring a time the plurality of users remain on a page of each e-book;
  measuring a rate the plurality of users cycle through pages of each e-book;
  determining one or more areas of each e-book that have been highlighted by the plurality of users; and
  determining a frequency amount related to the plurality of users revisiting each section of the plurality of e-books.

14. The system of claim 13, wherein determining the interest score for each section of the plurality of sections of each e-book using the reader data comprises combining values of the two or more metrics.

15. The system of claim 9, wherein the method performed by the processor further comprises:
  analyzing a plurality of book reviews from an internet service, wherein the plurality of book reviews are related to the identified two or more e-books having similar scoring matrices;
  correlating the plurality of book reviews with the identified two or more e-books; and
  augmenting the recommendation based on the correlating.

16. The system of claim 9, wherein the recommendation is further based on comparing trend vectors for the plurality of e-books.

17. A computer program product comprising a computer-readable storage medium having program instructions embodied therewith, wherein the computer-readable storage medium is not a transitory signal per se, the program instructions executable by a processor to cause the processor to perform a method comprising:
  receiving, from a user, a request for a recommendation for a book that is similar to a first electronic book (e-book);
  determining an interest score for the first e-book and for a plurality of other e-books;
  analyzing the first e-book and the plurality of other e-books to determine a set of sentimental scores for the e-books;
  comparing a scoring matrix for the first e-book to the scoring matrices for the plurality of e-books;
  determining, based on the comparing, that a second e-book of the plurality of e-books is similar to the first e-book; and
  recommending the second e-book to the user.

18. The computer program product of claim 17, wherein the method performed by the processor further comprises generating the scoring matrix for the first e-book and for each of the plurality of e-books using the interest score and the set of sentimental scores for the e-books.

19. The computer program product of claim 17, wherein the interest score is determined from reader data collected from a plurality of user devices, wherein the reader data is representative of reading habits of a plurality of users.

20. The computer program product of claim 17, wherein the set of sentimental scores are determined by applying natural language analysis to textual content of the e-books to detect sentiment and emotion, wherein the sentimental score comprises a polarity score related to sentiment and a plurality of emotion scores related to emotion found within the textual content.

* * * * *